United States Patent [19]

Egee et al.

[11] 4,188,819
[45] Feb. 19, 1980

[54] METHOD AND APPARATUS FOR SENSING GAS PRESSURE IN A CONTAINER

[75] Inventors: Walter W. Egee, Wallingford, Pa.; George R. Weaver, Maple Shade, N.J.

[73] Assignee: Campbell Soup Company, Camden, N.J.

[21] Appl. No.: 969,728

[22] Filed: Dec. 15, 1978

[51] Int. Cl.² ............................................. G01M 3/36
[52] U.S. Cl. ....................................... 73/52; 73/45.4; 73/49.3
[58] Field of Search ................. 73/52, 45.4, 49.2, 49.3; 116/200; 209/597

[56] References Cited

U.S. PATENT DOCUMENTS

| | | | |
|---|---|---|---|
| 1,825,699 | 10/1931 | Landrum | 73/49.3 |
| 1,825,744 | 10/1931 | Landrum | 73/49.3 |
| 1,974,026 | 9/1934 | Hicks | 73/49.3 |
| 2,040,798 | 5/1936 | Schoonmaker | 116/200 X |
| 3,094,239 | 6/1963 | Baker | 73/52 X |
| 3,371,781 | 3/1968 | Armbruster et al. | 73/52 X |
| 3,441,132 | 4/1969 | Browning | 73/52 X |
| 3,736,899 | 6/1973 | Manske | 73/52 X |
| 3,859,844 | 1/1975 | Hruby | 73/45.4 |

*Primary Examiner*—Jerry W. Myracle
*Assistant Examiner*—Joseph W. Roskos
*Attorney, Agent, or Firm*—Howson and Howson

[57] ABSTRACT

A check is provided of the gas pressure in a closed container having in its bottom wall a snap-action diaphragm of a type which assumes its concave-inward configuration when there is a vacuum of at least a predetermined level in the container, and assumes its convex-outward configuration when the vacuum level in the container is zero or less than said predetermined level. A test stand applies to the exterior of the diaphragm a vacuum sufficient normally to assure that it will assume its convex outward configuration, and then releases the applied vacuum to permit the diaphragm to snap to its concave-inward configuration. A proximity sensor produces an electrical signal representing the position of the diaphragm, which signal is differentiated to produce a signal indicating the speed of inward motion of the diaphragm. The differentiated signal is compared with a reference, and if it exceeds the reference, produces an indication that the inward snap-action has occurred and that the vacuum level in the container is adequate. The arrangement is applied to the high-speed checking of food containers for gas leaks.

15 Claims, 8 Drawing Figures

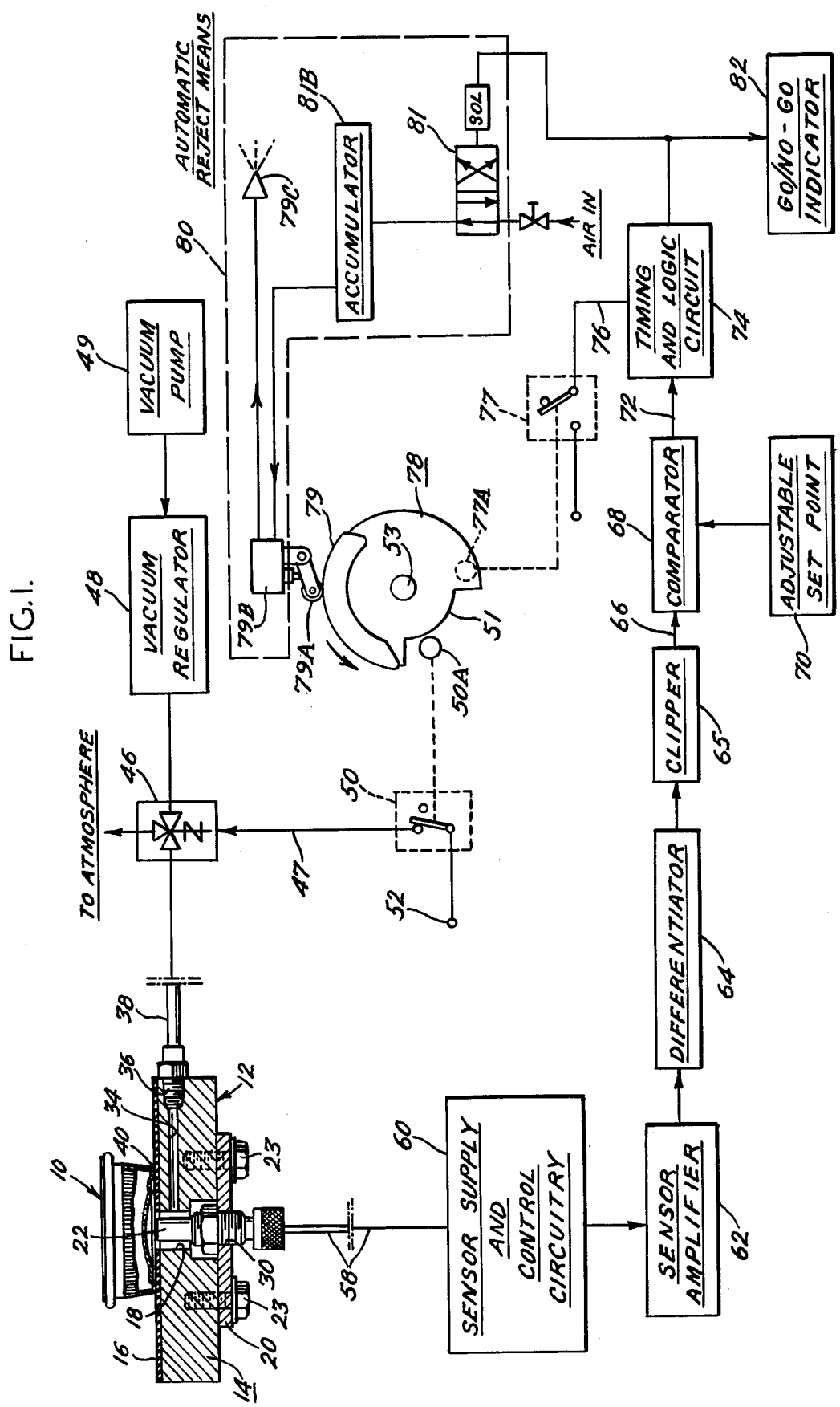

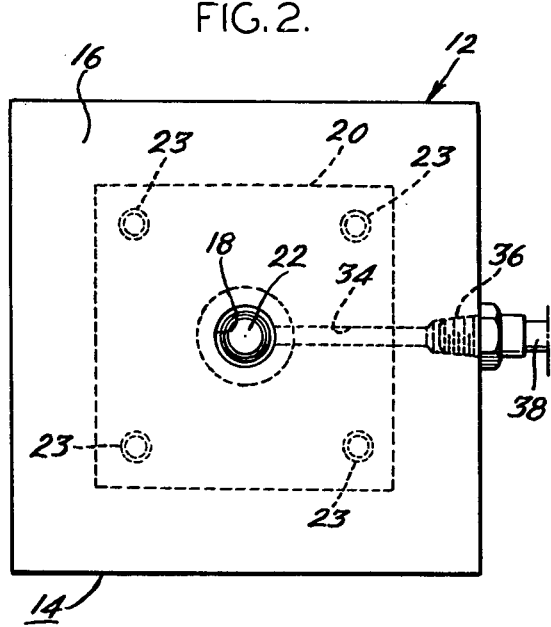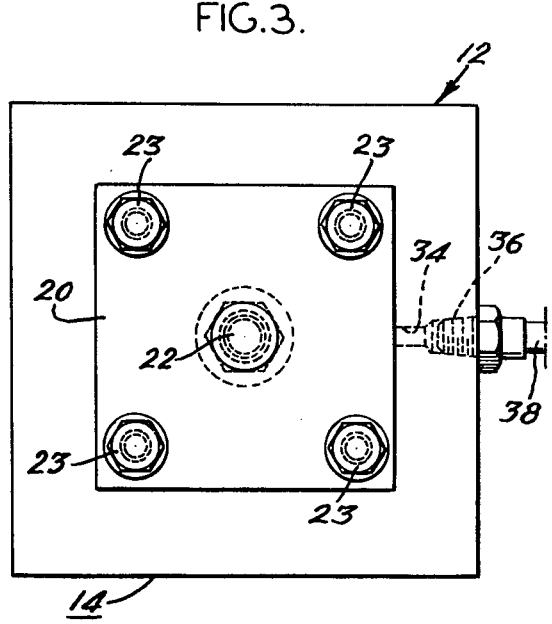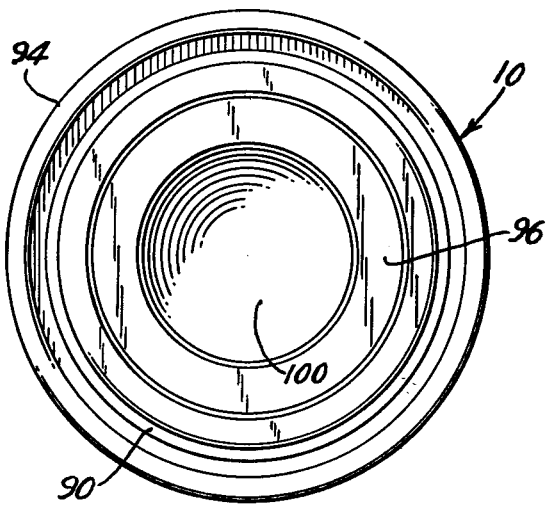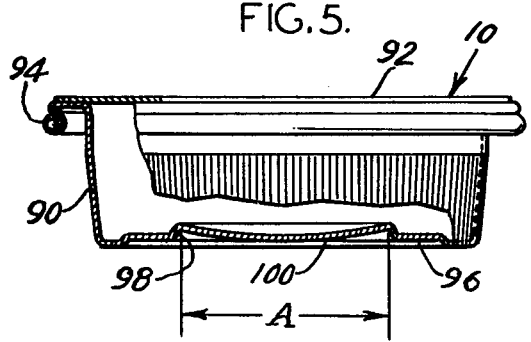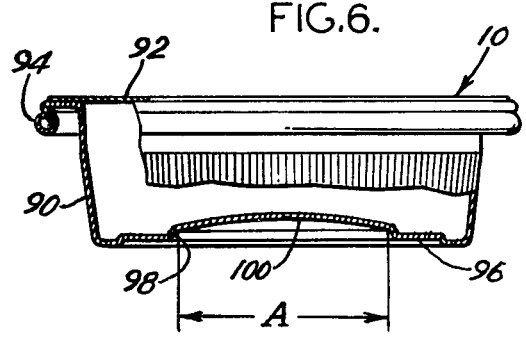

METHOD AND APPARATUS FOR SENSING GAS PRESSURE IN A CONTAINER

BACKGROUND OF THE INVENTION

This invention relates to method and apparatus for sensing gas pressure in a container, and particularly to such method and apparatus for rapidly sensing whether the vacuum level in a closed container is above a predetermined minimum level, thereby to provide an indication of whether the container has, or has had, one or more gas leaks in its walls.

There are many applications in which it is desirable to sense the gas pressure within a closed container. For example, the container may contain a material which would be deleteriously affected by exposure to ambient air, as may occur if the container is not hermetically sealed but instead is subject to gas leakage through its walls. To provide indications of whether such a gas leak has occurred, the interior of the container may be provided with a partial vacuum when it is initially sealed, so that a later loss or reduction in this vacuum will indicate that leakage has occurred, with possible harm to material in the container.

One specific application of the invention, with respect to which it will be particularly described herein, arises in connection with food containers. It is well known that containers for many types of foods must be hermetically sealed since the food may otherwise be adversely affected by contaminating substances or organisms in the surrounding ambient air, or may undergo harmful chemical reactions when ambient air is permitted to leak into the container.

In filling food containers, it is common to leave a residual head space or empty portion at the top of the container, and to close and seal the container while its contents are still at an elevated temperature. Upon subsequent cooling of the container to room temperature, the pressure of the gas in the container will drop below the ambient level to produce a partial vacuum in the container. So long as the gas within the container remains at a substantially reduced pressure, i.e. at a predetermined minimum level of vacuum, it can normally be safely assumed that the sealing procedure provided a satisfactory gas seal, and that there has not been subsequent substantial gas leakage through the walls of the container. On the other hand, complete or partial loss of the vacuum in the container is properly taken as an indication that a gas leak has occurred, and that the food may have been deleteriously affected.

A variety of methods and apparatuses have been proposed in the prior art for the purpose of measuring or checking the presence of vacuum inside a closed container. One general class of such arrangements takes advantage of the fact that at least some portion of a wall of the container will move inwardly in response to a vacuum within the container, and will move outwardly toward its original position if the internal vacuum is lost. One class of such systems utilizes the continuous or progressive deflection of a "linear" diaphragm in proportion to the differential pressure between its opposite surfaces, the diaphragm being one of the usual walls of the container or a specially constructed portion of one wall of the container. In another class of such systems, a special snap-action diaphragm is provided in a portion of the walls of the container, which snap-action diaphragm has an inwardly-extending configuration when the gas pressure in the container is considerably lower than that of a surrounding ambient, an outwardly-extending configuration when the internal vacuum is absent or very low, and moves between these inward and outward positions with a very rapid snap action in response to gas pressure changes, rather than deflecting in a smooth continuous manner.

One difficulty encountered if one tries to use a linear or proportionally-deflecting diaphragm system to detect the level of vacuum in a container arises from the normal variations occurring in manufacture of the container, including the diaphragm walls, which produce differences between containers with regard to the absolute position of the diaphragm wall with respect to a reference portion of the container. Because of this, the deflected position of the diaphragm in different containers is not a reliable indication of the pressure within the container.

The snap-action diaphragm has a number of advantages over the proportional or linear diaphragm, and has been proposed for use in a number of different arrangements. Such a diaphragm acts somewhat like the bottom of the usual squirt-type oiling can, in that it maintains a stable relatively outward position when the differential pressure urging it inward is zero or of low value, suddenly snaps to a second, inwardly-deflected position when the differential pressure reaches a predetermined switching level, remains substantially in its second inwardly-deflected position for pressures above that switching level, and will revert to its original relatively outward position when the inwardly-acting differential pressure is reduced below a predetermined level. The differential pressure level at which the diaphragm switches to its inward position can be made relatively consistent as between different containers made by the same process. Such a diaphragm is therefore particularly useful in providing an indication of whether the differential pressure is above or below the level at which snap-action occurs, and for certain purposes this is all the information that is necessary, the exact value of the differential pressure not being required. With this approach, not only is it possible to produce containers having diaphragms with reproducible switching levels, but also the distinctive abrupt snap action is easy to detect and observe unambiguously.

U.S. Pat. Nos. 1,825,699 and 1,825,744 of Landrum issued Oct. 6, 1931 and Oct. 6, 1931 respectively, illustrate one manner in which snap-action diaphragms have been utilized previously. In U.S. Pat. No. 1,825,699, the snap-action diaphragm is normally and desirably deflected inwardly of the container by the vacuum in the container, and the container is placed within an evacuated chamber containing a vacuum sufficient to cause the diaphragm to snap outwardly only if the internal vacuum has fallen below a predetermined standard value; such outward flipping, if it occurs, indicates a faulty container, and is electrically sensed to operate a buzzer. In U.S. Pat. No. 1,825,744, the sound made by the diaphragm when it snaps outwardly is used as an indication of the faulty can. However, such a diaphragm which has suffered an undesired mechanical distortion due to impact or improper manufacturing may not snap outwardly in response to the applied test vacuum, even though the container may have lost its internal vacuum, and may therefore be classified as a satisfactory can when it is in fact faulty. U.S. Pat. No. 1,974,026 of Hicks discloses a somewhat similar arrangement in which a normally inwardly-deflected diaphragm is sucked outwardly by applied test vacuum of increasing magnitude until it encounters an electrical contact to sound a buzzer, the level of the test vacuum necessary to accomplish this being noted and taken as an indication of the internal vacuum of the container.

A common difficulty with such previous snap-action diaphragm systems for sensing internal vacuum lies in the fact that the containers and diaphragms are susceptible to types of damage which may change or eliminate the snap action in a manner which results in a test determination that the container has satisfactory vacuum when in fact it has not. Such distortions of the desired snap action can occur through loss of temper of the material of the container, through accidental mechanical deformation, or through excessive internal reduced pressure developing forces in excess of the yield point of the container material. Any of these conditions can cause the diaphragm to remain in its inwardly deflected position even though the vacuum has been lost. Under such conditions, there will appear to be a reasonably strong internal vacuum since the diaphragm remains in its inward configuration, and if an external vacuum is applied to pull it outwardly it may resist in a manner indicative of the presence of a substantial vacuum in the container.

Accordingly, it is an object of the invention to provide a new and useful method and apparatus for sensing gas pressure in a container.

Another object is to provide such method and apparatus which will reliably indicate whether the vacuum in the container is above or below a predetermined minimum acceptable level.

Another object is to provide such method and apparatus which will reliably indicate that the vacuum level within the container is above a predetermined minimum level only when such is actually the case.

A further object is to provide such an apparatus which will perform these functions rapidly, simply and reliably.

A further object is to provide such method and apparatus which does not require complex and expensive equipment for the purpose of making the vacuum measurements.

SUMMARY OF THE INVENTION

In accordance with the invention, a new and useful method and apparatus of the following type is provided. An outwardly directed force is applied to the exterior of the snap-action diaphragm, preferably by applying a predetermined vacuum thereto, sufficient to cause the diaphragm to assume its more outward position unless it is damaged to such an extent that it cannot do so. The outwardly directed force is then discontinued, as by removing the external vacuum, and the snapback of the diaphragm to its more inward position detected; preferably, speed of the inward motion of the diaphragm is sensed and compared with a reference level to establish that the return speed reaches at least a predetermined minimum level characteristic of the inward snap action. If in fact the container has a sufficient level of internal vacuum the diaphragm will snap outward in response to the external vacuum, and will snap rapidly inward when that vacuum is removed, with a minimum speed characteristic of normal inward snap-action.

Under these circumstances, the attainment of a predetermined minimum inward velocity is a positive indication of proper vacuum in the container. If the vacuum has been lost, or is excessively low, the diaphragm will be pulled outwardly by the applied vacuum, but will remain in its outward position when the vacuum is released, so that no snap return of the diaphragm to its inward position will occur or will be detected. If the vacuum has been completely lost, or is extremely low, the diaphragm will be in its outward position even before the external test vacuum is applied, will not return to its inward position, and hence will produce an indication of a faulty container. If the container is damaged so that the diaphragm is not pulled out by the vacuum, then there will be no return snap action to be detected by the apparatus and the container will again be sensed as being faulty. Also, if the container has been damaged in a manner such that the diaphragm is pulled outwardly by the vacuum but will not return to its inward position upon removal of the vacuum, it will be sensed as a faulty container. Thus only those containers having an appropriately high level of internal vacuum and having a diaphragm which will move outwardly in response to external vacuum and snap properly to its inward position when the vacuum is removed will be indicated as satisfactory. While it is conceivable that a container may have adequate internal vacuum and, because the snap-acting characteristics of its diaphragm have been damaged, will be detected as faulty, the rejection of such damaged containers is tolerable and in many respects desirable, and the system will still perform its essential purpose of assuring that those cans indicated as having satisfactory internal vacuum in fact do so.

Apparatus for detecting the occurrence of normal inward snap-action of the diaphragm preferably comprises a test stand on which the container to be tested is received in a test position so that the exterior of the diaphragm communicates with an evacuable chamber also containing the sensor of a proximity sensor means for producing first electrical signals representative of the distance between the sensor probe and the diaphragm; a source of vacuum is connected through a control arrangement to the evacuable chamber to suck the diaphragm to its outward position if it is not already in that position, and to thereafter reduce the vacuum in the chamber to permit the wall portion to snap to its more inward position in responce to an adequate vacuum in the container. Differentiating means respond to the first electrical signal to produce a second electrical signal representative of the speed with which the wall portion snaps to its more inward position, and a threshold comparator compares the speed-representing second signal with a reference, to produce an output indicative of a "good" container if the speed-representing signal exceeds the threshold level. The comparator output signal may be used to control whether or not an alarm system and/or apparatus for diverting the container from the train of "good" containers is operated.

The apparatus of the invention therefore operates in a simple and relatively economic and reliable manner to produce reliable indications of only those containers which contain a satisfactory level of internal vacuum, by subjecting the container to conditions in which such snap action should occur if there is a satisfactory internal vacuum level, and detecting whether such inward snap action does then occur.

BRIEF DESCRIPTION OF FIGURES

Other objects and features of the invention will be more readily understood from a consideration of the following detailed description, taken in connection with the accompanying Figures in which:

FIG. 1 is a representation showing a system according to the invention principally in block diagram form, with some parts shown by schematic symbols and with the test stand and a representative container shown partially in vertical section;

FIG. 2 is a plan view of the test stand;

FIG. 3 is a bottom view of the test stand;

FIG. 4 is a bottom view of a representative container;

FIGS. 5 and 6 are side views, with portions broken away, of the container, showing it with its diaphragm in its convex outward and concave inward positions, respectively;

DETAILED DESCRIPTION OF SPECIFIC EMBODIMENTS

Figure 8:
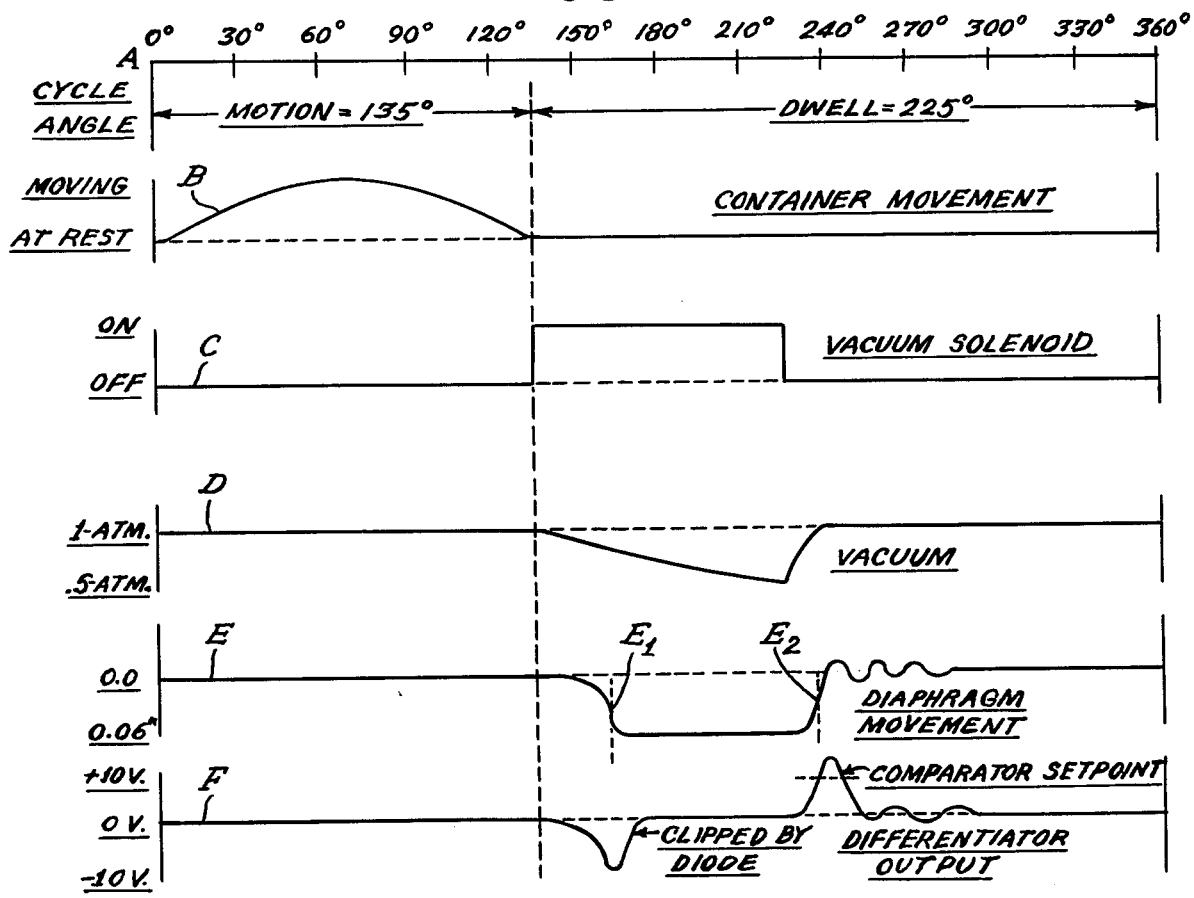
FIG. 8 is a timing diagram illustrating certain time relationships in the operation of the system of the invention.

Referring now specifically to the embodiment of the invention shown in the drawings by way of example only, FIG. 1 illustrates a system embodying the invention in a form suitable for detecting whether the vacuum in the closed container 10 is above or below a predetermined level, and for automatically rejecting the container if the vacuum does not meet the predetermined standard. In this example the container 10 is of a drawn metallic foil, unitary except for the circular top cap thermally bonded thereto, as discussed hereinafter in more detail with particular reference to FIGS. 4–6.

The container 10 is assumed to have been previously filled with a hot material, for example condensed soup, the cap thermally bonded thereto, and the container and contents cooled substantially to room temperature whereby, if the container is leak-proof, a predetermined minimum level of vacuum will exist within the container.

The container 10 is shown in testing position on the test station 12. This station comprises a main support body 14 having a resilient gasket 16 of elastomeric material sealed to its upper surface by an appropriate cement. A central aperture 18 extends vertically through the support body and gasket. A sensor-mounting plate 20 carries a proximity sensor probe 22, which extends vertically through central aperture 18 to a position just short of the top of the gasket 16. Plate 20 may be secured to the underside of main support body 12 by means of bolts 23. In this example probe 22 is provided with external threads so that it may be screwed into corresponding internal threads in a corresponding opening 30 in the center of mounting plate 20. Plate 20 is provided with an air-tight seal with body 12, as by means of an appropriate cement between body and plate, and the threads of probe 22 are also air-tight, as by coating the threads with an appropriate sealing material prior to screwing it into the mounting plate.

A bore 34 extends horizontally from central aperture 18 through the interior of main support body 14 to an appropriate nipple insert 36, which is sealedly threaded into the exterior end of bore 34, whence there extends an external vacuum line 38. It will be understood that the single-line connections shown extending from the right-handed end of vacuum line 38 are schematic, indicating suitable vacuum line connections. By the above-described arrangement, a vacuum-tight connection is provided between vacuum line 38 and the interior of central aperture 18.

To conduct the vacuum test, the container 10 is positioned co-axially with the top opening of central aperture 18, with the lower peripheral edge 40 of the container resting on resilient gaskets 16. Between tests, vacuum line 38 is exhausted to atmosphere through solenoid-controlled three-way valve 46, which is normally spring-biased to its exhaust position; when container 10 is to be tested, the solenoid of valve 46 is actuated over electrical line 47 to connect vacuum line 38 through valve 46 and conventional vacuum regulator 48 to vacuum pump 49, thereby to exhaust the space beneath the container 10 to a predetermined vacuum level, the lower peripheral edge 40 of container 10 forming an appropriate vacuum seal with the resilient gasket 16 at such times. Vacuum regulator 48 is set to provide the desired degree of vacuum in the space below container 10 during such test times.

While valve 46 may be manually operated, it is preferred to accomplish this automatically in response to arrival of container 10 in its desired test position. This is accomplished in this example by means of a container-position sensor switch 50 containing a switch element which is normally open, but is closed momentarily when the container moves into its test position, thereby momentarily to supply voltage from a source 52 to the solenoid of valve 46 at the time when container 10 will be stationary in its testing position; after a predetermined interval, switch 50 is automaticaly opened to terminate the solenoid current and permit valve 46 to return to its exhaust position while container 10 is still in its test location.

There are a variety of ways in which container-position sensor switch 50 may be actuated, the choice thereof depending especially upon the particular conveying arrangement in which the system is to be used. In one preferred form, sensor 50 is operated by a cam portion 51 on the drive shaft 53 which drives the conveyor for conveying container 10 into and from its testing position; however, the position of container 10 can be sensed photoelectrically or magnetically, as further examples, so long as the arrangement provides switch 50 with an indication of when container 10 is in its stationary test position.

Accordingly, with the arrangement shown, container 10 will be advanced into the test position, valve 46 will operate to apply a reference vacuum level to the underside of container 10, valve 46 will then be deactuated to exhaust to atmosphere the space under container 10, and container 10 will then be moved out of the test position to be replaced by a subsequent container to be tested.

Proximity sensor probe 22 may be a conventional device, such as one producing on its output line 58 a DC level which increases substantially linearly with decreasing distance from the underside of the container 10. Sensor supply and control circuit 60 may be a standard commercially-available unit containing an appropriate power supply and suitable circuitry for linearizing the sensor response and supplying the linearized signal to a conventional sensor amplifier 62 in appropriate form.

The output of sensor amplifier 62, in this example a DC signal inversely proportional to the height of the bottom of container 10 above the top surface of probe 22, is passed through a conventional analog differentiator 64 and a clipper 65 to produce at lead 66 a signal whose instantaneous amplitude represents the rate of change of the sensor output signal, and hence the vertical velocity of the bottom of container 10. Normally the differentiated signal will comprise a pulse extending in one direction corresponding to downward motion of the container bottom and a pulse extending in the opposite direction corresponding to upward motion of the container's bottom; in the present embodiment only the pulse corresponding to the upward motion of the container bottom is used, the other pulse being removed by clipper 65 in well-known manner.

The differentiated signal from clipper 65 is supplied to a conventional comparator 68, which is also supplied with a pre-selected voltage level from adjustable set point 70. Comparator 68 operates to produce a signal on its output line 72 only when the output of differentiator 64 exceeds the voltage level from adjustable set point 70, and hence output signal will appear on output line 72 of comparator 68 only when the upward velocity of container 10 exceeds a predetermined minimum acceptable value indicative of inward snap-action of the bottom of container 10.

The latter signal on line 72 is applied to timing and logic circuit 74, which is also supplied over lead 76 with a control signal from timing control switch 77, which is in effect a single-pole double throw switch applying one signal level to circuit 74 when the switch is in one position and another signal level when the switch is in its other position. Operation of switch 77 between the two positions is, in this example, controlled by cam wheel 78 so as to change signal level at about the same time that application of the external vacuum to the diaphragm is terminated. Timing and logic circuit responds to the signal output of comparator 68 and to the change in signal level from switch 77 to enable the automatic reject means 80 whenever comparator 68 fails to produce a signal representing a container having adequate internal vacuum; if comparator output signal is present, operation of switch 77 is prevented from enabling the automatic reject means and reject does not occur.

However, in the absence of such output from comparator 68, the automatic reject means is enabled. The automatic reject means may, for example, be of the type which directs a blast of air against the side of the faulty container to remove it from the conveyor. In the present example the automatic reject means is not immediately actuated, since the container is still in its test position; instead, it is actuated by cam portion 79 on cam wheel 78 only after the faulty container has been moved out of test position by the conveyor, and then only if the automatic reject means has been previously enabled by the timing and logic circuit. In the embodiment shown, the automatic reject means is enabled by automatically operating a solenoid-controlled pneumatic valve 81 to charge an accumulator 81B with compressed air each time switch 77 is operated and there is no output from comparator 68, and is actuated when cam portion 79 causes cam follower 79A to open air valve 79B, after the faulty container has left its test position, to release a blast of compressed air from the accumulator through valve 79B and nozzle 79C against the side of the faulty container to be removed from the conveyor. In this example, one revolution of the cam wheel occurs in the time for one complete test cycle and switches 50 and 77 are operated to their vacuum-on and enable positions only when the movable switch-controlling contacts 50A and 77A, respectively, are within the clear segment of cam wheel 78. A go/no-go indicator 82 such as a lamp is also supplied with the enable output of the timing and logic circuit 74 to provide a visual indication of the detection of a faulty container.

Considering now particularly FIGS. 4–6, these Figures show one type of closed container to which the method and apparatus of the invention may be applied, not necessarily to exact scale. The container consists of a cup portion 90 and a covering lid 92. The cup portion may be of drawn aluminum foil about 0.004 inch in thickness having vertical fluting around its circumference extending from the bottom part way toward its top, and a rolled-under top rim 94. The lid 92 extends outwardly over the rim 94, and is thermally bonded thereto in known manner, so as to be readily removably by manually peeling it off, while providing a good hermetic seal prior to removal. A suitable tab for grasping the lid during removal may be provided (not shown). U.S. Pat. Nos. 3,850,340 and 3,695,084 illustrate rim constructions and techniques suitable for making containers of this general type.

In one application of the invention, the diameter of the top rim may be about 2 inches, overhanging the remainder of the cup portion by about ⅛ inch laterally; the cup portion may be about ⅝ inch in height, with the unfluted portion of the cup extending below the underside of the rim by about 2/10 inch. The bottom of the cup portion 90 is appropriately stamped to provide annular recessed ring portion 96, the inner side of which is continuous with an annular inwardly-sloped ring portion 98, the bottom of the cup being completed by the central circular, flexible, snap-action diaphragm 100, having the diametral extent indicated as A. Diaphragm portion 100 has the convex outward configuration shown in FIG. 5 when the differential pressure across it is zero or small, and has the concave inward configuration of FIG. 6 when the pressure inside the container is sufficiently below atmosphere. Thus the diaphragm 100 has the configuration of FIG. 5 in the event that there is little or no vacuum inside the container, or if the diaphragm is being held in its downward position shown by an externally-applied vacuum; the inwardly concave configuration of FIG. 6 is that which exists when the container has at least a predetermined desired minimum value of partial vacuum within it, and has not been pulled downwardly by an externally-applied vacuum.

Figure 7:
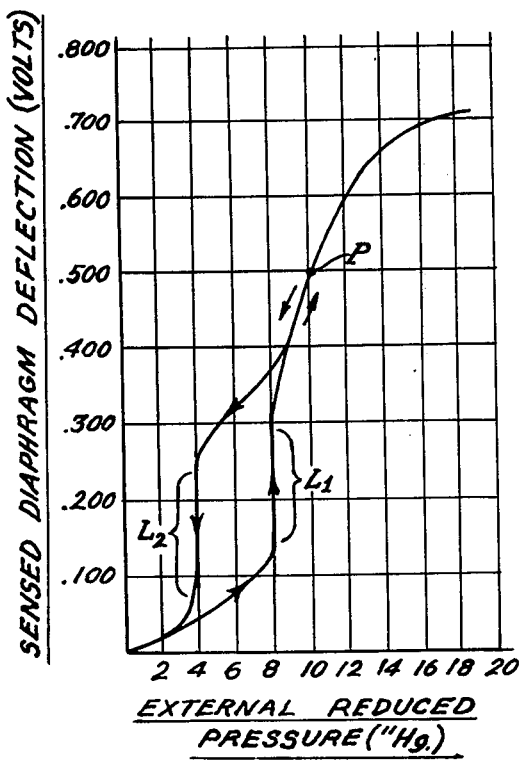
FIG. 7 is a graphical representation to which reference will be made in describing the snap action of the diaphragm.

FIG. 7 illustrates graphically the typical nature of the snap action of the diaphragm 100. In FIG. 7, ordinates represent the outward deflection of the diaphragm 100 from its convex-inward configuration of FIG. 6, as indicated by the voltage produced at the output of sensor amplifier 62. Abscissae represent the external reduced pressure, in inches of mercury, applied to the bottom of the diaphragm by way of vacuum line 38 of FIG. 1. As can be seen from FIG. 7, at zero external reduced pressure the diaphragm has not moved from its maximum concave-inward position. With increasing external reduced pressure up to about 6 or 7 inches of mercury, the diaphragm moves slightly outward as the stress exerted by the internal partial vacuum is partially compensated by the external reduced pressure. As the external reduced pressure approaches 8 inches of mercury, the diaphragm suddenly snaps to the convex-outward configuration of FIG. 5, corresponding to more than 0.30 volts of sensor output. Continued increase in the external reduced pressure, for example to about 10 inches (point P in FIG. 7), causes further outward deflection of the diaphragm, but at a reduced rate. If one then gradually decreases the external reduced pressure, at about 4 inches of mercury the diaphragm snaps rapidly inwardly from a position corresponding to about 0.25 volts to a position corresponding to about 0.05 volt. As the external reduced pressure is further decreased, the diaphragm continues to move inwardly, but at a reduced rate, back toward its original maximum-inward configuration.

The general form of the graph of FIG. 7 is characteristic of a normal or "good" container having an adequate level or partial vacuum therein, indicative of the fact that gas leakage has not occurred into the container. It is noted that this characteristic includes an outward snap-action along leg $L_1$ of the curve, and a distinctive inward snap-action along the leg $L_2$ of the graph. It is the existence of the inward snap-action motion of the diaphragm corresponding to leg $L_2$ which, according to the present invention, is sensed to provide an indication of a satisfactory container containing adequate partial vacuum.

More particularly, if the external reduced pressure applied to the diaphragm is increased to a value such as P in FIG. 7 and thereafter allowed to decline to zero through the exhausting action of valve 46, the resultant inward snap movement of the diaphragm in traversing leg $L_2$ of FIG. 7 produces an output from differentiator 64 of a magnitude sufficient to overcome the threshold or reference established by adjustable set point 70 and thus to produce an output on output line 72 of comparator 68 indicative of a "good" container.

If on the other hand the container has lost its partial vacuum, it will be at a position such as P of FIG. 7 when the external vacuum is applied, and will move slightly farther outward in response to the applied vacuum, in the direction of increasing sensor output voltage; however, when the external vacuum is removed, the diaphragm will return rather slowly to its original position at point P and will not execute any inward snap action. Accordingly, while some output from the differentiator 66 may exist, because of the slow motion of the diaphragm the differentiated signal will not be sufficiently large to reach the threshold set by adjustable set point 70, and there will be no output from the comparator 72, thus indicating a faulty container.

If the container has been damaged, it may fail to move outward in response to the external reduced pressure and hence be unable to exhibit an inward snap action; or, it may respond to the external reduced pressure and be sucked outwardly, but will not snap inward again if the container has lost its normal vacuum.

Thus, in any of these cases where the internal vacuum has been lost or the container damaged so that it does not execute proper snap action, the output of the differentiator will be zero or insufficient to produce an output from the comparator, and an indication of a satisfactory container will not occur.

It will be understood that the set point for the comparator is adjusted to a level which will reliably be exceeded by the differentiated sensor signal when a normal inward snap action occurs, but which will not be exceeded in response to other slower inward motions of the diaphragm which may occur during the test procedure.

For the particular example of container types and dimensions described above, in one application of the invention the container contained condensed soup filling about 95% of the volume of the interior of the container and having a temperature of about 60°–90° C. at the time of sealing of the lid thereto. The lid or top closure in the example was of aluminum, about 0.002 inch in thickness; the reference level of external reduced pressure was, for example, about 16″ Hg.

Referring now to FIG. 8, in which various quantities are plotted as ordinates against a common horizontal axis A representing the degrees of rotation of main drive shaft 53, one revolution of which corresponds to one cycle of the test operation, the angles shown extend from an angle of 0° at which a container begins to move onto the test stand to an angle of 360° at which it begins to move off of the test stand and the next container begins to move onto the test stand. At B there is shown the movement of the container in one such cycle; it is moving into position on the test stand for the first 135° of rotation of the drive shaft, and remains stationary on the test stand for the remaining 225° before moving from the test stand.

At C of FIG. 8 as shown the condition of the solenoid of valve 46, which causes the valve to be closed to atmosphere and hence apply vacuum to the diaphragm in the interval from 135° to about 225°.

At D of FIG. 8 is shown the variation in the vacuum applied to the exterior of the diaphragm, which is zero (1 atmosphere) until the beginning of the valve-closed interval at 135°, when the vacuum begins to build up to about 0.5 atmosphere at the angle of 225°, whereupon the valve opens and the vacuum falls rapidly back to zero.

At E of FIG. 8 is shown the output of sensor amplifier 62, representing the deflection motion of the diaphragm. At $E_1$ the voltage drops suddenly corresponding to outward snap-action of the diaphragm from its concave-inward to convex-outward configuration; at $E_2$ the voltage rises abruptly, corresponding to the inward snap-action of the diaphragm, followed by a short period of decaying vibration of the diaphragm as it settles into its original stable concave-inward configuration.

At F of FIG. 8 is shown the output signal of differentiation 64. The negative pulse corresponding to speed of outward snap-action of the diaphragm is removed by clipper 65; the positive pulse representing the speed of inward snap-action of the diaphragm is compared with the comparator set point, and as shown exceeds the set point, thereby indicating a satisfactory level of vacuum inside the container.

The container and the location and form of the diaphragm can take any of many different forms depending upon the particular application, and the design of a system for any particular application should take into consideration the minimum level of internal vacuum considered to be satisfactory, the size, shape and flexibility of the diaphragm and the container, including any lid, so that the inward snap action will certainly occur when and only when the desired minimum level of internal vacuum exists. In the case in which the diaphragm is supported in a surrounding container wall which may flex outwardly in response to the externally applied vacuum, care should be taken in design to assure that any inward motion of the diaphragm after discontinuance of the externally applied vacuum, which occurs due to such flexing of the wall supporting the diaphragm, is not of sufficient speed to move the diaphragm inwardly at a rate comparable to the normal inward snap action of the diaphragm, so that the comparator set point can readily be set to cause the comparator to ignore differentiated signals due to wall flexing alone while responding properly to inward snap action of the diaphragm.

In the foregoing detailed example, specific values and ranges of vacuum levels, dimensions, and specific materials, and particular forms of apparatus have been described so as to provide an example from which one skilled in this art may readily make and use the invention in one preferred form. However, such parameters may vary greatly from those stated, in various applications. For example, the form, materials and dimensions of the container and diaphragm, the head space in the container, the nature of the product, its temperature, and the form and parameters of the vacuum system and the electronic circuitry may differ greatly from those of the specific example. As examples only, the fluting on the sides of the container is not necessary, especially when thicker walls are used, and the temperature of the product need not be elevated if a vacuum is formed in the container by other means.

Thus while the invention has been shown and described with particular reference with specific embodiments thereof, it will be understood that it may be embodied in a variety of forms diverse from those specifically shown and described, without departing from the spirit and scope of the invention as defined by the appended claims.

What is claimed is:

1. A method of testing the vacuum level in a closed container having a snap-action wall portion which assumes a more inward position when said vacuum level is sufficiently great, assumes a more outward position when said vacuum level is of a lesser value, and normally exhibits a rapid snap action in moving between said positions, comprising:
   applying an outwardly-directed force to said wall portion sufficient to assure that it is in said more outward position, and thereafter discontinuing said applying of said force and detecting whether said wall portion then snaps into said more inward position.

2. The method of claim 1, wherein said detecting comprises sensing the speed with which said wall portion snaps into said more inward position.

3. The method of claim 2, wherein said detecting comprises sensing whether said speed attains a predetermined value during said snapping of said wall portion into said more inward position.

4. The method of claim 1, wherein said applying of said force comprises applying a vacuum to the outer surfaces of said wall portion.

5. The method of claim 1, wherein said detecting comprises producing an electrical signal representative of the motion of said wall portion and comparing said electrical signal with a standard.

6. The method of claim 5, wherein said electrical signal is representative of the speed with which said wall portion snaps into said more inward position.

7. Apparatus for testing the vacuum level in a closed container having a wall portion which assumes a more inward position when said vacuum level is sufficiently great, assumes a more outward position when said vacuum level if of a lesser value, and normally exhibits a rapid snap action in moving between said positions, comprising:
   means for applying an outwardly-directed pulling force to said wall portion sufficient to assure that it is in said more outward position;
   means for discontinuing said applying of said force; and
   means for detecting whether said wall portion then snaps into said more inward position.

8. The apparatus of claim 7, wherein said detecting means comprises means for sensing the speed with which said wall portion snaps into said more inward position.

9. The apparatus of claim 8, wherein said detecting means comprises means for sensing whether said speed attains a predetermined value during said snapping of said wall portion into said more inward position.

10. The apparatus of claim 7, wherein said means for applying said force comprises means for applying a vacuum to the outer surface of said wall portion.

11. The apparatus of claim 7, wherein said detecting means comprises means responsive to motion of said wall portion for producing an electrical signal representative of said motion and for comparing said electrical signal with a standard.

12. The apparatus of claim 11, wherein said electrical signal is representative of the speed with which said wall portion snaps into said more inward position.

13. Apparatus for testing the vacuum level in a closed container having a wall portion which assumes a more inward position when said vacuum level is sufficiently great, assumes a more outward position when said vacuum level is of a lesser value, and normally exhibits a rapid snap action in moving between said positions, comprising:
   a test stand comprising support means for receiving said container in a test position, a controlledly evacuable chamber having an opening communicating with the exterior of said wall portion when said container is in said test position, and proximity-sensor means having a sensor probe positioned in said chamber adjacent the exterior of said wall portion for producing first electrical signals representative of the distance between said probe and said exterior of said wall portion;
   a source of vacuum;
   means for controlledly connecting said chamber to said source of vacuum to produce in said chamber a vacuum level sufficient to assure that said wall portion is in said more outward position thereof;
   means for thereafter reducing the vacuum in said chamber to permit said wall portion to snap to said more inward position in response to an adequate vacuum in said container;
   differentiating means responsive to said first electrical signal for producing a second electrical signal representative of the speed with which said wall portion snaps into said more inward position;
   a source of an electrical reference level; and
   threshold comparator means responsive to said reference level and to said second electrical signal for producing a third electrical signal indicative of whether said third signal attains a predetermined value corresponding to said reference value.

14. A method for checking the degree of vacuum in a container, comprising:
   providing in at least a part of a wall of said container a flexible snap-action diaphragm which exhibits a stable convex-outward configuration and substantial spring stiffness for steady values of pressure differential acting inwardly with respect to said container and lying in a first lower range of values, which exhibits a stable concave-inward configuration and substantial spring stiffness for steady values of said pressure differential lying in a second range of values higher than said first range, and which exhibits a rapid snap-action transition between said convex-outward and said convave-inward configurations in response to changes of said pressure differential between a value in said first, lower range and a value in said second, higher range;

reducing the pressure at the exterior of said diaphragm to a value such that said diaphragm is in said convex outward configuration;

thereafter increasing said pressure thereupon sensing the motion of said diaphragm to produce a signal indicative of whether said diaphragm performs said snap-action transition from said convex to said concave configuration.

15. The method of claim 14, comprising sensing the speed with which said diaphragm moves during said snap-action transition.

* * * * *